A. DAVIS, JR

May 2, 1933. HYDRAULICALLY OPERATED TANK VALVE Re. 18,817

Original Filed Jan. 3, 1929

INVENTOR
Augustine Davis Jr.
By J. J. Kemlenberg
ATTORNEY

Reissued May 2, 1933

Re. 18,817

UNITED STATES PATENT OFFICE

AUGUSTINE DAVIS, JR., OF CINCINNATI, OHIO

HYDRAULICALLY-OPERATED TANK VALVE

Original No. 1,781,369, dated November 11, 1930, Serial No. 330,125, filed January 3, 1929. Application for reissue filed April 27, 1932. Serial No. 607,847.

The invention relates to tank outlet valves in which a normally-closed valve member is opened by means of a hydraulic device or servo-motor. A drawback of such devices is the fact that quantity of air is likely to be trapped in the top of the device, which reduces the efficiency and promptness of the operation since the air is compressible. It is the custom of the company manufacturing the device to manipulate it carefully by turning it over and repeatedly injecting the operating liquid until the air is all driven out, after which the device is sealed and sent to the customer full of liquid. The user is then presented with a difficulty in connecting the device with the pipe line and control apparatus without letting any of the liquid escape, while keeping the pipe line and its connected apparatus full, so that air shall not be present therein.

These difficulties are overcome in the present invention by the provision of means for conducting air from the top of the liquid-receiving space of the device, so that the air may be expelled by liquid admitted after the device has been connected up for use, after which the exit of the vent is closed. With this provision it is unnecessary for the manufacturer of the device to fill and seal it, and the device can be connected to a pipe line while both are empty.

The particular object of the invention is to provide means for evacuating air from the servo-motor of a tank valve externally of the tank, said means affording an indication when all air has been expelled from the device and the latter filled with operating liquid, the vent being then closed by means applied or operated outside of the tank. A further object is to apply the vent in such manner that the entire device is readily removable from and applicable to the tank outlet or to an external outlet body.

Figure 1:
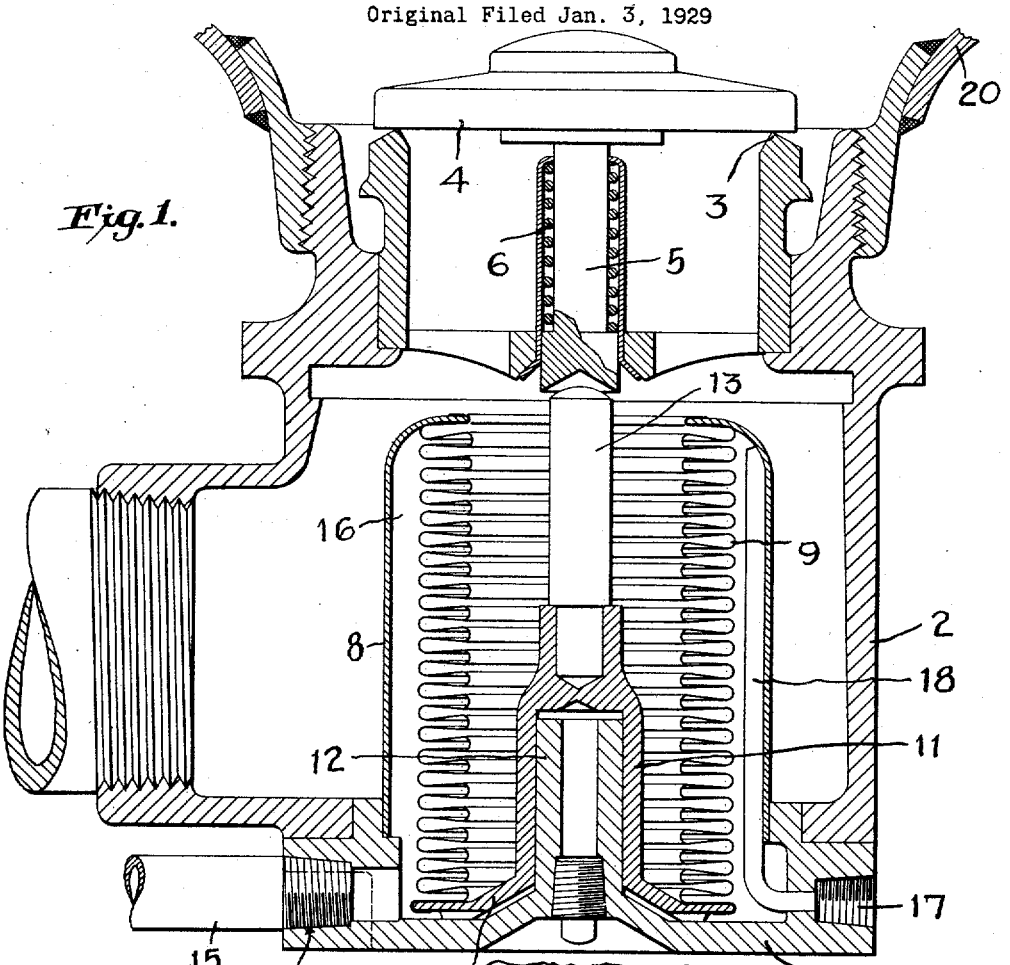
Figure 2:
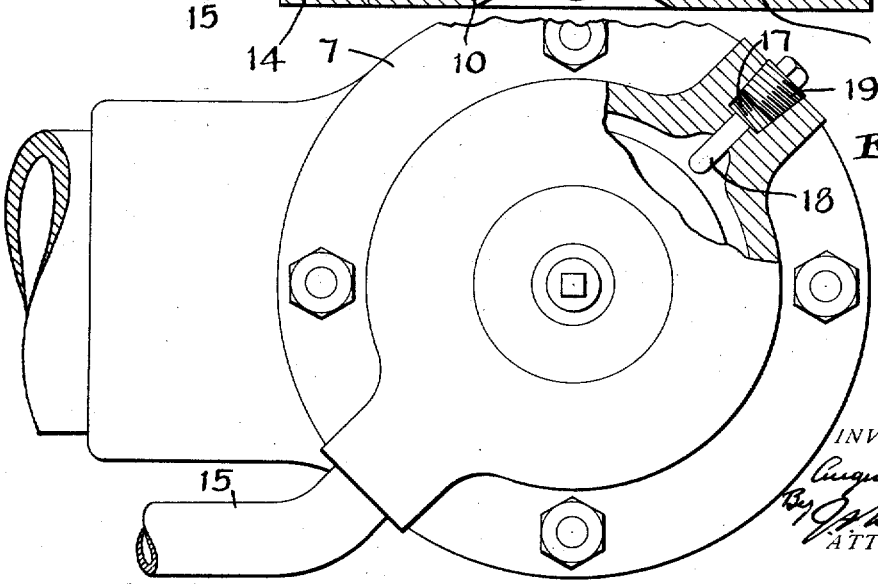

In the accompanying drawing forming part hereof:

Fig. 1 is a vertical sectional view of a tank valve embodying the invention; and Fig. 2 is a bottom plan view, partly broken out and in section, showing the exit of the vent tube closed.

The numeral 2 designates an external outlet and valve body having a valve seat 3 in its upper portion. A valve member 4 having a depending stem 5 is seated by a spring 6. The valve body is secured in the bottom outlet of a tank, a portion 20 of which is shown.

In the specific, preferred form of the invention illustrated, the servo-motor for lifting the valve member is a metal bellows device located in the lower part of the valve body on a removable base-plate 7, forming the bottom wall of the body. A cylinder 8 is fixed at its lower end to this base-plate, and to its upper end is tightly connected the upper end of a tubular metal bellows 9. The lower end of this bellows is tightly secured to a movable head 10, having a socket portion 11 which is guided on a post 12 rising from the base plate. A rod 13 secured to the socket portion 11 extends upward to act upon the valve stem 5.

The base-plate 7 has a screw-threaded opening 14, to which is connected the pipe 15 for admitting liquid pressure medium to the space 16 between the bellows and the cylinder and beneath the removable head. In the ordinary operation of the apparatus, the liquid, which fills the entire hydraulic valve operating system, is displaced in and out through this opening and pipe, when the control means (not shown) connected with the pipe is operated to apply and release the pressure.

The base-plate is provided with another screw-threaded opening 17, and from this opening a vent tube 18 extends upward practically to the top of the space 16, where its upper or inlet end is open.

After the device has been installed and connected up, operating liquid is introduced through the line 15 until all the air inside the device has been displaced by liquid. When liquid flows out of the exit 17 of the vent, it will be evident that the device is substantially full of liquid. The opening 17 is then closed permanently, or semi-permanently, by a plug 19. Similarly, air can be discharged from the operating chamber of the servo-motor, or from connected parts of the hydraulic system through this chamber, at any time after the apparatus has been put in use, if air should enter the system.

The invention makes it possible to bleed the actuating bellows of the bottom outlet valve of a tank externally of the tank or chamber. Since the vent 18, as well as the operating line 15, is connected with the detachable bottom plate 7, the entire operating device can be removed from and applied to the external outlet body 2 by simply attaching and detaching this plate.

It will be understood that the invention is not limited to the precise form illustrated.

I claim:

1. A hydraulically operated tank valve to be controlled from a remote point having a body adapted to be applied to the tank outlet and carrying a normally-closed outlet valve member and a hydraulic servo-motor associated with the valve member to lift the same, said body having, in addition to an opening for connecting the servo-motor with a remote source of hydraulic operating pressure, an air-vent duct in communication with the upper portion of the liquid-receiving chamber of the servo-motor, the outlet of said air-vent duct being outside the tank, and there being means for closing said duct after the air has been expelled from said chamber by the operating liquid.

2. A hydraulically operated tank valve to be controlled from a remote point having a body adapted to be applied to the tank outlet and carrying a normally-closed outlet valve member and a hydraulic servo-motor associated with the valve member to lift the same, said body having, in addition to an opening for connecting the servo-motor with a remote source of hydraulic operating pressure, an opening to the outside of the tank for venting air from the liquid-receiving chamber of the servo-motor, means for closing this opening, and an air-vent tube extending from this opening upward into said chamber of the servo-motor.

3. A hydraulically operated tank valve to be controlled from a remote point having a body applied from beneath to the outlet of the tank and carrying a normally-closed outlet valve member and a hydraulic servo-motor associated with the valve member to lift the same, said body comprising a removable part to which the servo-motor is connected, said removable part having two openings communicating with the liquid-receiving chamber of the servo-motor, one of said openings being adapted to be connected with a remote source of hydraulic operating pressure, and the other opening being an external vent provided with a closure, and means forming a vent passage extending upward from the vent opening to the upper portion of said chamber.

4. A hydraulically operated tank valve to be controlled from a remote point having an external body applied to the tank outlet, said body carrying a normally-closed outlet valve member and a servo-motor beneath said valve member for lifting the same, the bottom of said body being removable and supporting said servo-motor and having, in addition to an opening for connection with a remote source of hydraulic operating pressure, a vent opening provided with a closure, and means forming a passage for evacuating air from the upper portion of the liquid-receiving chamber of the servo-motor through said vent opening.

5. A hydraulically operated tank valve comprising the combination of an external body applied to an outlet from the tank, a spring-seated valve member normally closing the entrance to said body, a detachable plate closing the bottom of said body, a casing carried by said plate inside the body, a tubular metal bellows inside said casing and secured thereto at the upper end, a head secured to the lower end of said bellows, a thrust member connected with said head for unseating said valve member, said plate having two openings through it, an operating line connected to one of said openings, a closure for the other of said openings, and a vent tube extending upward from the latter opening to the top of the space between said bellows and said casing.

AUGUSTINE DAVIS, Jr.